UNITED STATES PATENT OFFICE.

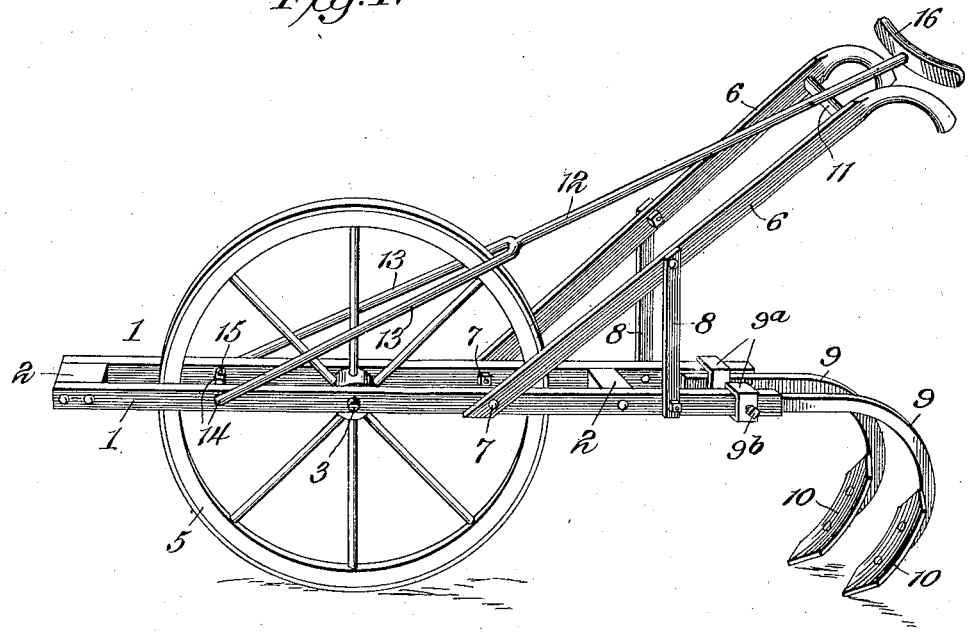
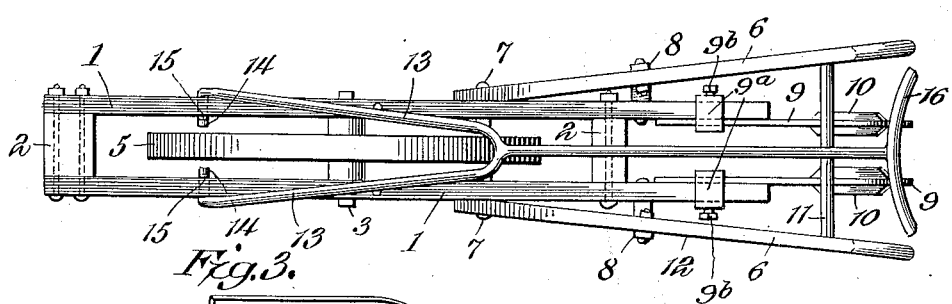
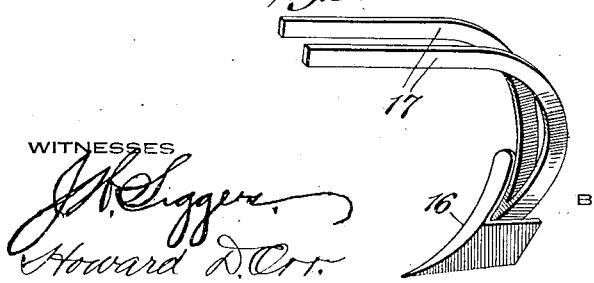

LEWIS T. THOMASSON, OF CORINTH, MISSISSIPPI.

GARDEN-PLOW.

1,353,091. Specification of Letters Patent. Patented Sept. 14, 1920.

Application filed June 26, 1920. Serial No. 391,955.

*To all whom it may concern:*

Be it known that I, LEWIS T. THOMASSON, citizen of the United States, residing at Corinth, in the county of Alcorn and State of Mississippi, have invented a new and useful Garden-Plow, of which the following is a specification.

This invention relates to hand cultivators or garden plows.

The object is to provide a construction of hand cultivators of simple, light and durable construction, having the usual handles to be grasped by the hands of the operator for forcing the ground-engaging shovels into and through the ground, such operation being, in the present invention, materially assisted by the employment of a push bar adapted to be engaged by the breast of the operator, whereby the weight of the operator may be utilized to ease this more or less tiresome operation.

A further object is to provide an implement of this character with a supplemental pushing device which may be readily adjusted to accommodate itself to the breasts of operators of different heights, the said device being pivotally mounted upon the machine frame in such a manner as to freely move up and down with the body of the operator, thus avoiding discomfort or any irritation, and also being mounted with relation to the axle of the supporting wheel and the handles as to balance the frame of the machine in opposition to the pressure of the hands, so as to keep the shovels on a uniform course through the ground.

A full and complete understanding of the invention may be obtained from a consideration of the following detailed description taken in connection with the accompanying drawing forming part of this specification with the understanding, however, that the invention is not confined to any strict conformity with the showing of the drawing, but may be changed and modified, so long as such changes and modifications mark no material departure from the salient features of the invention as expressed in the appended claims.

In the drawing, in which similar reference characters designate corresponding parts throughout the several figures:—

Figure 1 is a perspective view of a garden plow constructed in accordance with the present invention;

Fig. 2 is a plan view of the same;

Fig. 3 is a detail perspective view of a form of ground-engaging plow or shovel to be used in conjunction with the implement.

In the use of the ordinary hand plow or cultivator, where it is necessary to propel the same entirely through pressure brought to bear by the hands of the operator, extreme difficulty is encountered in the endeavor to keep the shovels on a uniform course through the ground. Where hard or unevenly broken ground is encountered, the tendency of the shovels or teeth is to rise out of the ground when sufficient pressure is brought to bear to force the same ahead, and the effort to overcome these difficulties soon becomes very tiresome.

With a hand cultivator or plow constructed in accordance with the present invention, these objections are entirely eliminated, and it is possible by regulating the pressure of the hands and the breast of the operator to produce a smooth and even furrow without much exertion.

As illustrated in Fig. 1 of the drawing, the implement comprises a pair of longitudinally disposed beams 1—1, which may be constructed of wood, as shown, or of some suitable metal, all of the parts of the device being susceptible of being made of metal, though for the sake of cheapness and lightness some of the parts, as hereinafter designated, may be formed of wood. Front and rear spacer blocks 2—2 are suitably secured between the beams 1—1 to hold the same apart, the said beams extending somewhat to the rear of the rear spacer block as shown.

Mounted upon a suitable axle 3 carried by the beams, and midway between the blocks 2—2, is a suitable carrying wheel 5, which may be formed of wood or metal or both as illustrated, and said wheel is adapted to support the entire front end of the frame of the machine, and to roll over on top of the ground surface in the usual manner, the hub of the wheel being preferably provided with suitable ball bearings.

The handle bars 6—6 which may be formed of wood are secured to the outer faces of the beams 1—1 by bolts 7—7 located at a point in rear of the axle of the wheel substantially half way between the same and the rear spacer block 2, and said handle bars extend rearwardly and upwardly and diverge outwardly in the usual manner, and are braced by upright supports 8—8.

Extending from the rear ends of the beams 1—1 are standards 9—9 which may be suitably clamped to the inner or the outer faces of the beams, and curve downwardly and are suitably formed for the reception of bolts or other fastening devices for holding cultivator shovels or teeth 10—10, or any other ground working tools, as will be readily understood.

The clamps for adjustably binding the forwardly extending arms of the standards 9 to the rear ends of the beams 1—1 consist of rectangular metallic collars 9ª adapted to surround the abutting pairs of beams and standards thus permitting of longitudinal as well as angular adjustment of the standards with relation to the beams, the said collars having set screws 9ᵇ to hold the same in position to clamp.

The handle bars 6—6 are provided near their upper ends, adjacent to the grip portions thereof, with the usual cross bar 11 which serves to hold the same in spaced relation, and the entire machine, as far as described, may be of any ordinary or well-known construction.

The pusher bar comprises a stout metal bar 12 of sufficient strength and size to withstand the pressure to which it is subjected in operation, and said bar is forked at its front end to span the wheel and provide a pair of diverging arms 13—13 terminating at their front ends in pivots 14—14, which pass through suitable apertures in the beams 1—1, located at a point in advance of the axle 3 exactly equal to the distance between the latter and the fastening bolts 7—7 of the handle bars, cotter-keys 15 being mounted on the ends of the pivots to hold the same in place.

The bar 12 is adapted to normally lie in an inclined position in rear of the wheel 5, with the front forked portion straddling the latter and, when the machine is not in use, the bar rests upon the cross bar 11, which serves to support the same. A transversely arranged breast plate 16 suitably curved to fit the breast of the operator, is secured to the rear end of the bar 12 in any suitable manner, and may be padded to cushion the same when in use.

When it is desired to use a single ground-engaging tool, such as a plow, which must be centrally located in rear of the wheel 5, as will be understood, the said plow 16, as illustrated in Fig. 3, is provided with a pair of diverging, forwardly-extending standards 17—17, which may be readily clamped to the rear ends of the beams 1—1 by the collar 9ª, at either the inner or the outer faces thereof, and permit of any desired adjustment of the same.

It will be seen that the breast plate 16 may be readily raised or lowered to suit the height of the operator, and that the latter may bear his weight against the said plate, thus transmitting the pressure to the beams 1—1 in advance of the axle of the supporting wheel, and at the same time by pressure, in the usual manner, upon the bars, he may regulate the depth of cut of the shovels, and maintain a balanced effect upon the beams 1—1, whereby the extreme strain upon the hands and arms is lessened, and the work of operating the implement is made considerably easier. It will also be seen that the pressure of the hands tends to drive the tools into the ground, while the pressure of the breast has the opposite effect, so that by regulating the two pressures an even course may be maintained, and the combined pressures serve to propel the tools much more easily through the ground.

The novel feature of this invention is confined to the position of the pivots of the push bar in advance of the axle, and the fact that the distance of said pivots from the axle is substantially equal to the distance of the connection of the handles to the beams.

From the foregoing it will be seen that an extremely simple, strong and efficient means has been provided which may be attached to hand implements of this class of various kinds, whereby the work of operating the same is considerably eased and simplified, and more uniform and perfect plowing or cultivation of the ground accomplished.

What is claimed is:

1. The combination with beams, terminating at one end in standards carrying shovels, an axle journaled in the beams at a point between the ends thereof, a wheel mounted on the axle between the beams, handles rigidly connected to the beams in rear of the axle, and a push bar pivotally connected to the beams in front of the axles, and spaced from and independent of the latter, said push bar carrying at its free end a breast support.

2. The combination with a frame mounted midway of its length upon a supporting wheel, said frame carrying shovels at its rear end and handles secured to the frame in rear of the axis of said wheel, of a push bar arranged longitudinally of the frame and having its forward end forked to straddle the said wheel, the arms constituting the fork terminating in pintles pivoted for vertically swinging action to the frame, said pivots being located at a distance in advance of the wheel axis substantially equal to the distance between the latter and the point of attachment of the handles, said push bar being adapted to normally rest upon the cross bar of the handles, and a breast plate carried by the rear end of the push bar to fit the breast of the operator when elevated.

In testimony, that I claim the foregoing as my own, I have hereto affixed my signature.

L. T. THOMASSON.